(12) United States Patent
Van Steenkist et al.

(10) Patent No.: US 9,499,098 B1
(45) Date of Patent: Nov. 22, 2016

(54) COLLISION AVOIDANCE SYSTEM FOR HIGH-PERFORMANCE NON-COMMERCIAL AIRCRAFT

(71) Applicant: Honeywell International Inc., Morristown, NJ (US)

(72) Inventors: Vernon J. Van Steenkist, Syracuse, NY (US); Ruy C. Brandao, Redmond, WA (US); Kevin S. Wilson, Shawnee, KS (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/702,334

(22) Filed: May 1, 2015

(51) Int. Cl.
  *G08G 5/04* (2006.01)
  *B60Q 9/00* (2006.01)
  *G08G 5/00* (2006.01)

(52) U.S. Cl.
  CPC ............. *B60Q 9/008* (2013.01); *G08G 5/0008* (2013.01); *G08G 5/04* (2013.01)

(58) Field of Classification Search
  CPC ....... B60Q 9/008; G08G 5/0008; G08G 5/04
  See application file for complete search history.

(56) References Cited

U.S. PATENT DOCUMENTS

| | | | |
|---|---|---|---|
| 4,196,434 | A | 4/1980 | Funatsu et al. |
| 4,755,818 | A | 7/1988 | Conrad |
| 4,918,442 | A | 4/1990 | Bogart, Jr. |
| 5,185,606 | A | 2/1993 | Verbaarschot et al. |
| 5,315,363 | A | 5/1994 | Nettleton et al. |
| 5,321,489 | A | 6/1994 | Defour et al. |
| 5,872,526 | A | 2/1999 | Tognazzini |
| 6,531,978 | B2 | 3/2003 | Tran |

(Continued)

FOREIGN PATENT DOCUMENTS

WO    2013014338 A1    1/2013

OTHER PUBLICATIONS

Sabatini et al., "LIDAR Obstacle Warning and Avoidance System for Unmanned Aircraft," World Academy of Science, Engineering and Technology, International Journal of Mechanical, Aerospace, Industrial and Mechatronics Engineering, vol. 8, No. 4, Apr. 2014 (month of publication not indicated on face of document but is indicated at https://www.waset.org/journal/Mechanical), 12 pp.

(Continued)

*Primary Examiner* — Michael J Zanelli
(74) *Attorney, Agent, or Firm* — Shumaker & Sieffert, P.A.

(57) ABSTRACT

This disclosure is directed to systems and methods for aircraft collision avoidance with speed-based collision alert time thresholds. In one example, a system is configured to determine predicted trajectories for an own aircraft and a target aircraft. The system is further configured to determine whether a violation of protected airspace is predicted between the own aircraft and the target aircraft. The system is further configured to determine whether a predicted time to closest approach between the own aircraft and the target aircraft is less than an alert threshold time based on a speed of the own aircraft. The system is further configured to generate an alert output, in response to determining that a violation of protected airspace is predicted and that the predicted time to closest approach between the own aircraft and the target aircraft is less than the alert threshold time based on the speed of the own aircraft.

20 Claims, 4 Drawing Sheets

(56) References Cited

U.S. PATENT DOCUMENTS

| | | | |
|---|---|---|---|
| 6,690,296 | B2 | 2/2004 | Corwin et al. |
| 6,804,607 | B1 | 10/2004 | Wood |
| 7,479,923 | B2 | 1/2009 | Carpenter |
| 8,140,252 | B2 * | 3/2012 | Wise ................ G01C 21/00 701/120 |
| 8,319,679 | B2 | 11/2012 | Christianson |
| 8,380,367 | B2 | 2/2013 | Schultz et al. |
| 8,380,424 | B2 * | 2/2013 | Bushnell ............. G01C 23/005 340/961 |
| 8,446,295 | B2 | 5/2013 | Botargues et al. |
| 2010/0131126 | A1 | 5/2010 | He et al. |
| 2012/0158219 | A1 * | 6/2012 | Durling ................ G01S 5/0072 701/4 |
| 2012/0209457 | A1 * | 8/2012 | Bushnell ............... G01C 21/00 701/13 |

OTHER PUBLICATIONS

Munoz, C. et al., "A TCAS-II Resolution Advisory Detection Algorithm," American Institute of Aeronautics and Astronautics, Aug. 19, 2013 (date of publication not indicated on face of document but is indicated at http://ntrs.nasa.gov/search.jsp?R=20140002736), 12 pp.

* cited by examiner

COLLISION AVOIDANCE SYSTEM FOR HIGH-PERFORMANCE NON-COMMERCIAL AIRCRAFT

This disclosure relates to aviation.

BACKGROUND

Air traffic control systems track positions and velocity of aircraft and help prevent aircraft collisions. Air traffic control has traditionally been based on radar surveillance, supplemented more recently with cooperative radio surveillance techniques, such as automatic dependent surveillance-broadcast (ADS-B). An aircraft may determine its own position, such as via a Global Navigation Satellite System (GNSS), and periodically broadcast its position via a radio frequency, which may be read by ground stations and other aircraft. Aircraft position data may be provided to a variety of other applications that serve functions such as traffic situational awareness, traffic alert, and collision avoidance, for example. As a particular example, an aircraft may be equipped with a Traffic Collision Avoidance System (TCAS) unit.

SUMMARY

Various examples are described below generally directed to techniques, systems, devices, computer program products, and methods for aircraft collision avoidance systems with sensitivity levels and alert threshold times based on speed rather than altitude, which may be particularly useful for high-performance aircraft that may be exempt from commercial aviation speed-altitude standards and that may fly at high speeds at low altitudes. This may be true of military fighter trainer aircraft performing training missions from a domestic air base, for example. A collision avoidance system with speed-based alert thresholds may apply sensitivity levels that adjust collision alert times relative to predicted closest approach times based on aircraft speed, to issue alerts with enough time to change course based on the aircraft's speed, while refraining from issuing alerts prematurely and creating a nuisance.

Collision avoidance systems have typically been targeted for use on civil aviation aircraft and have typically been based on assumptions about the own aircraft and surrounding aircraft complying with civil aviation rules, such as flying at low speeds when at low altitudes such as proximate to airports, and only flying at high speeds when at high altitudes. For example, TCAS collision avoidance thresholds may typically be based on the RTCA DO-185B standard, which specifies that sensitivity levels for issuing collision avoidance alerts are based on altitude, with the assumption that aircraft at lower altitudes must have lower speeds. However, for an aircraft flying at very high speed at low altitude on a potential collision course with another aircraft, a typical TCAS unit would not issue an alert until there was little or no time left to change course. A collision avoidance system with speed-based sensitivity levels as disclosed herein may overcome these shortcomings of typical collision avoidance systems, and enable effective collision avoidance alerting sensitivity for high-speed aircraft at any altitude.

In one example, a system includes a unit configured to determine predicted trajectories for an own aircraft and a target aircraft. The system further includes a unit configured to determine whether a violation of protected airspace is predicted between the own aircraft and the target aircraft. The system further includes a unit configured to determine whether a predicted time to closest approach between the own aircraft and the target aircraft is less than an alert threshold time based on a speed of the own aircraft. The system further includes a unit configured to generate an alert output, in response to determining that a violation of protected airspace is predicted and that the predicted time to closest approach between the own aircraft and the target aircraft is less than the alert threshold time based on the speed of the own aircraft.

In another example, a method includes determining, by one or more processors, predicted trajectories for an own aircraft and a target aircraft. The method further includes determining, by the one or more processors, whether a violation of protected airspace is predicted between the own aircraft and the target aircraft. The method further includes determining, by the one or more processors, whether a predicted time to closest approach between the own aircraft and the target aircraft is less than an alert threshold time based on a speed of the own aircraft. The method further includes generating, by the one or more processors, an alert output, in response to determining that a violation of protected airspace is predicted and that the predicted time to closest approach between the own aircraft and the target aircraft is less than the alert threshold time based on the speed of the own aircraft.

In another example, a non-transitory computer program product is configured for loading or storing executable instructions on a collision avoidance computer. The computer program product includes a portion of executable instructions configured to determine predicted trajectories for an own aircraft and a target aircraft. The computer program product further includes a portion of executable instructions configured to determine whether a violation of protected airspace is predicted between the own aircraft and the target aircraft. The computer program product further includes a portion of executable instructions configured to determine whether a predicted time to closest approach between the own aircraft and the target aircraft is less than an alert threshold time based on a speed of the own aircraft. The computer program product further includes a portion of executable instructions configured to generate an alert output, in response to determining that a violation of protected airspace is predicted and that the predicted time to closest approach between the own aircraft and the target aircraft is less than the alert threshold time based on the speed of the own aircraft.

The details of one or more examples are set forth in the accompanying drawings and the description below. Other features, objects, and advantages will be apparent from the description and drawings, and from the claims.

Figure 1:
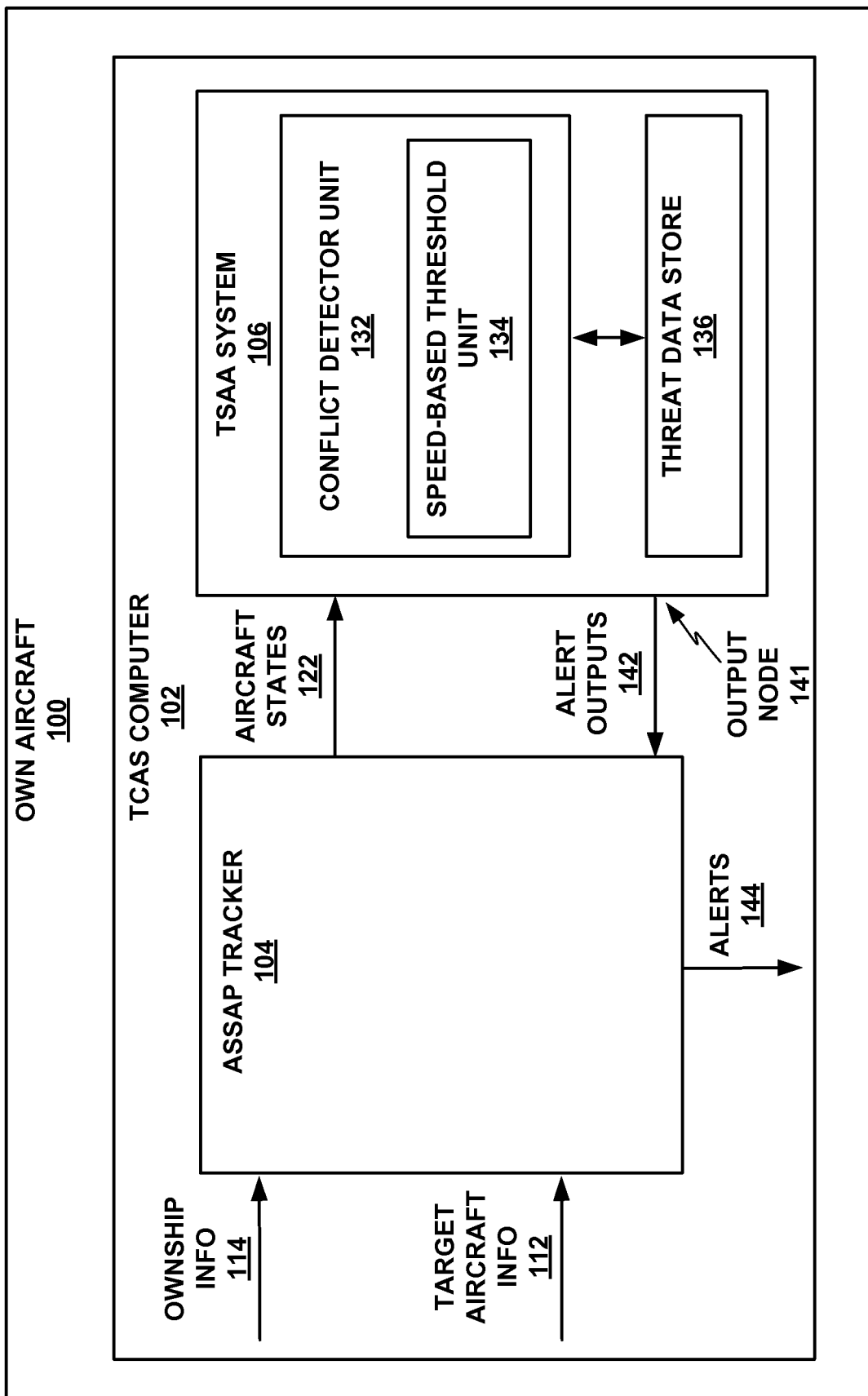
FIG. 1 shows a conceptual block diagram of an example own aircraft that includes a Traffic Collision Avoidance System (TCAS) computer that incorporates a speed-based threshold unit in an example implementation of this disclosure.

system as part of a TCAS computer and implemented on an own aircraft, with additional detail for illustrative examples in which a conflict detector unit of a TSAA system includes a speed-based threshold unit, as in FIG. 1.

Figure 3:
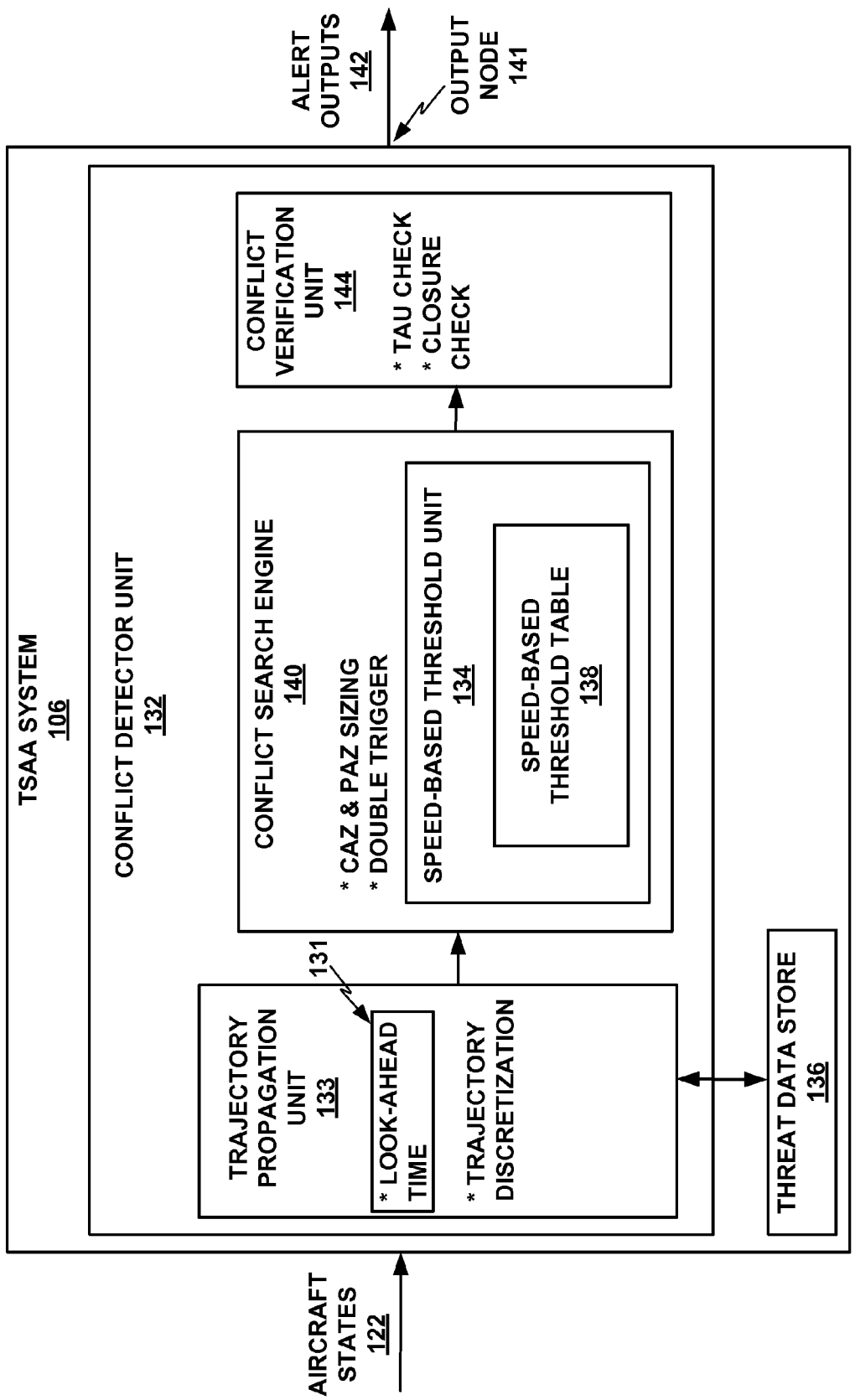
FIG. 3 depicts an example functional block diagram of an example Traffic Situation Awareness and Alert (TSAA)
Figure 4:
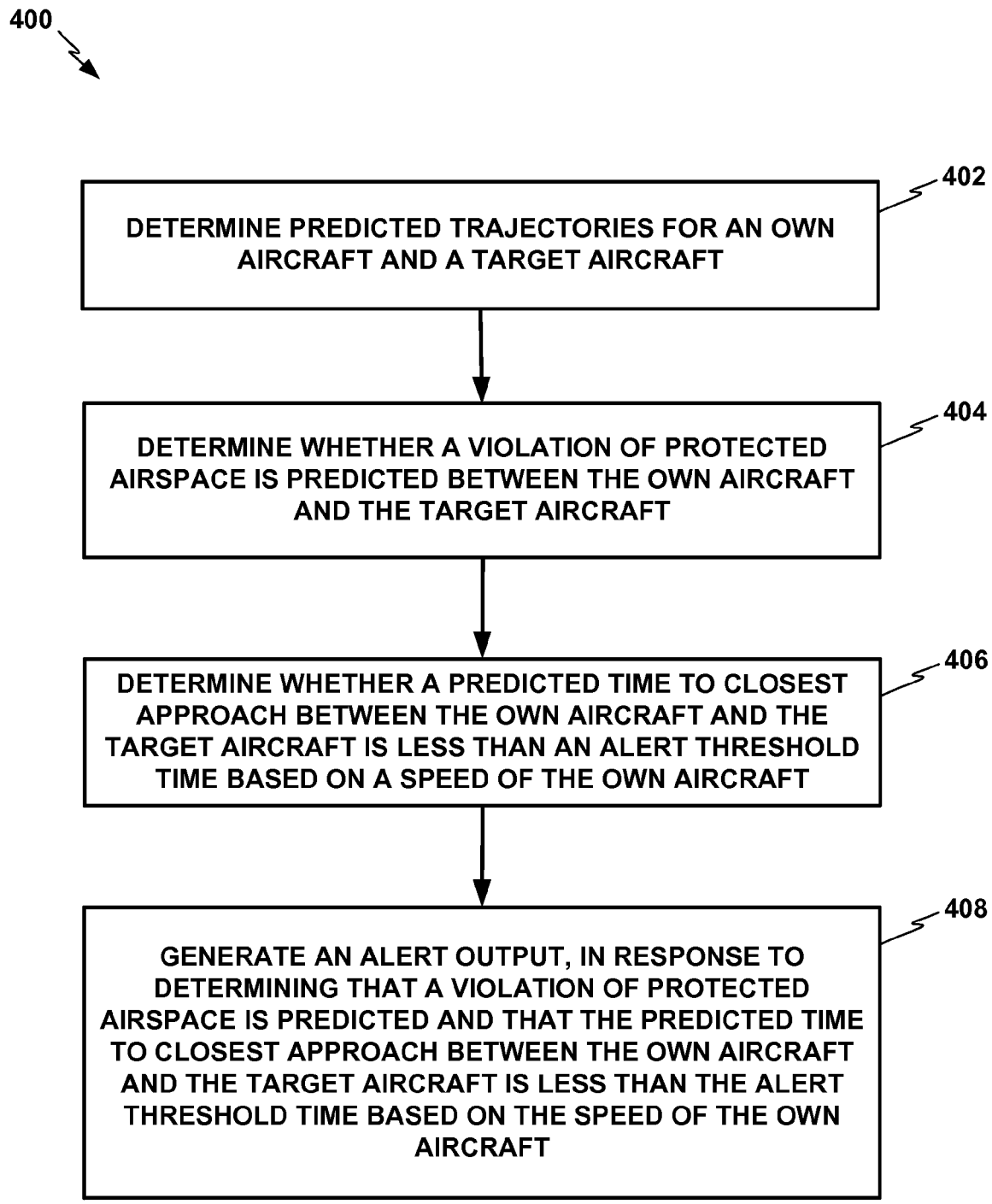

FIG. 4 shows a flowchart for a method that a TCAS computer with speed-based alert thresholds, as shown in FIGS. 1 and 3 and described with reference thereto, may perform in some examples.

DETAILED DESCRIPTION

FIG. 1 shows a conceptual block diagram of an example own aircraft (or ownship) 100 that includes a Traffic Collision Avoidance System (TCAS) computer 102 that incorporates a speed-based threshold unit in an example implementation of this disclosure. TCAS computer 102 may be incorporated as part of the avionics on own aircraft 100 in various examples. TCAS computer 102 includes an Airborne Surveillance and Separation Assurance Processing (ASSAP) tracker 104 and Traffic Situation Awareness and Alert (TSAA) system 106. TSAA system 106 includes a conflict detector unit 132 including speed-based threshold unit 134 that applies alert sensitivity thresholds based on the aircraft's speed. As shown in FIG. 1 and as further explained below, ASSAP tracker 104 interfaces with and uses TSAA system 106. TSAA system 106 may in some examples be implemented at least in part as a software package or software library comprising computer-executable instructions stored on and/or executed by TCAS computer 102, as well as data stored and/or processed at least in part by TCAS computer 102. TSAA system 106 may also be implemented in hardware or firmware in some examples. Own aircraft 100 and TCAS computer 102 may also include various other systems and components beyond those shown in FIG. 1 and described below.

TCAS computer 102 may incorporate at least some functions compliant with collision avoidance logic and Minimum Operational Performance Standards (MOPS or MPS) identified by the Radio Technical Commission for Aeronautics (RTCA) and required in commercial aviation and/or general aviation applications in the U.S.A. by the Federal Aviation Administration (FAA). Typically, this would include a TCAS computer being compliant with the DO-185 standard for sensitivity thresholds for collision avoidance based on altitude, rather than based on speed as in TCAS computer 102 of this disclosure. In many jurisdictions including in Europe, this may be equivalently covered by the EUROCAE ED-143 ACAS standard.

Own aircraft 100 may detect one or more other aircraft in its vicinity or within a certain range. The one or more other aircraft may be referred to as target aircraft, surrounding aircraft, or intruder aircraft. ASSAP tracker 104 may determine, based at least in part on incoming target aircraft information 112 applicable to one or more target aircraft, an estimated target aircraft trajectory state for each of one or more target aircraft within a selected range or vicinity. The target aircraft state may include trajectory state parameters such as position, ground speed and/or air speed, heading, altitude, and any rate of change in any of these state parameters. In some examples, ASSAP tracker 104 may determine and maintain a determined state (including all applicable state parameters) for each of the one or more target aircraft for as long as they remain active targets for tracking, e.g., they remain airborne and within an applicable range of the own aircraft. ASSAP tracker 104 may also maintain extrapolated, predicted future states, including predicted speed, heading, altitude, and position, for the own aircraft and all applicable target aircraft out to a selected common point in time in the future, and update those predicted states at a selected frequency, e.g., one or more hertz.

ASSAP tracker 104 may receive target aircraft information 112 from one or more target aircraft as inputs via an automatic dependent surveillance-broadcast (ADS-B) In Receiver and/or other surveillance data sources. Target aircraft information 112 may include air-to-air ADS-B reports, automatic dependent surveillance-rebroadcast (ADS-R), traffic information service-broadcast (TIS-B), active TCAS surveillance, and/or other sources of information on other aircraft. ASSAP tracker 104 may also receive own aircraft information 114, information on own aircraft 100, as inputs from any of various systems of own aircraft 100. ASSAP tracker 104 may process target aircraft information 112 and own aircraft information 114, and output aircraft states 122, including target aircraft states and own aircraft states, specifying position, speed, heading, and altitude information for the one or more target aircraft and the own aircraft, to TSAA system 106. TSAA system 106 may process the target aircraft information 112 and own aircraft information 114 including in accordance with speed-based threshold unit 134, as further explained below. An example of flight context for own aircraft 100 processing target aircraft information 112 and own aircraft information 114 in accordance with speed-based threshold unit 134 is discussed further below with reference to FIG. 2.

TSAA system 106 receives aircraft states 122 from ASSAP tracker 104 as inputs. TSAA system 106 includes a conflict detector unit 132 and a threat data store 136. Conflict detector unit 132 includes speed-based threshold unit 134. Conflict detector unit 132 may interact with threat data store 136 and use speed-based threshold unit 134, and potentially additional units or modules, to perform calculations based at least in part on aircraft states 122 and determine whether there is an imminent risk of two aircraft entering each other's protected airspace (or coming too close to each other, as further described below). The protected airspace may be defined relative to the respective aircraft and may define a volume of space around the aircraft. The protected airspace may also be referred to as a protected airspace zone. When conflict detector component 132 makes a determination of an imminent risk of a protected airspace violation, including by reference to speed-based threshold unit 134, TSAA system 106 may generate, via output node 141, one or more alert outputs 142 of TSAA system 106 to ASSAP tracker 104. The alert outputs 142 generated by TSAA system 106 may indicate target aircraft alert states and alert levels for one or more specific target aircraft indicated for protected airspace violations, in some examples.

ASSAP tracker 104 may then generate and output one or more alerts 144, e.g., to a pilot or flight crew of the own aircraft, based on the alert outputs 142 that ASSAP tracker 104 receives from TSAA system 106. ASSAP tracker 104 may output alerts 144 to audio and/or video output interfaces of own aircraft 100, such as a display and a loudspeaker of the aircraft (e.g., a display in Class II TCAS implementations and a loudspeaker in Class I or II TCAS implementations), and/or other systems, components, or devices to which TCAS computer 102 may be operably connected. The alerts 144 generated by ASSAP tracker 104 may also include indications of target aircraft alert states and alert levels for one or more specific target aircraft, based on information in the alert outputs 142 from TSAA system 106, in some examples. Additional details of TSAA system 106 are further described below.

The protected airspace of a general aviation aircraft in flight at low altitude may be within 500 feet (about 152 meters) horizontal and 200 feet (about 61 meters) vertical of the aircraft, in some examples. ASSAP tracker 104 may re-determine or re-compute target aircraft states and own aircraft states and output the recomputed or updated aircraft states 122 to TSAA system 106 at a rate of at or approximately one hertz or once per second, in some examples. ASSAP tracker 104 using TSAA system 106 may be specified to generate an alert when there is a risk of a protected airspace violation (or intrusion) within a selected interval of time of the predicted airspace violation, where the selected interval of time is based on the selected sensitivity level, which TSAA system 106 may select based, either entirely or at least in part, on the speed of the own aircraft.

TSAA system 106 may track protected airspaces around one or more target aircraft and the own aircraft, and also perform trajectory predictions for the one or more target aircraft and the own aircraft. TSAA system 106 may implement alerting decision logic based on both the protected airspaces and the predicted trajectories of each of one or more target aircraft and the own aircraft. TSAA system 106 may use the state parameters including position, heading, ground speed and/or air speed, and altitude of each of one or more target aircraft and the own aircraft as inputs in making its determinations of whether to trigger an alert and potentially what information to include in an alert.

Figure 2:
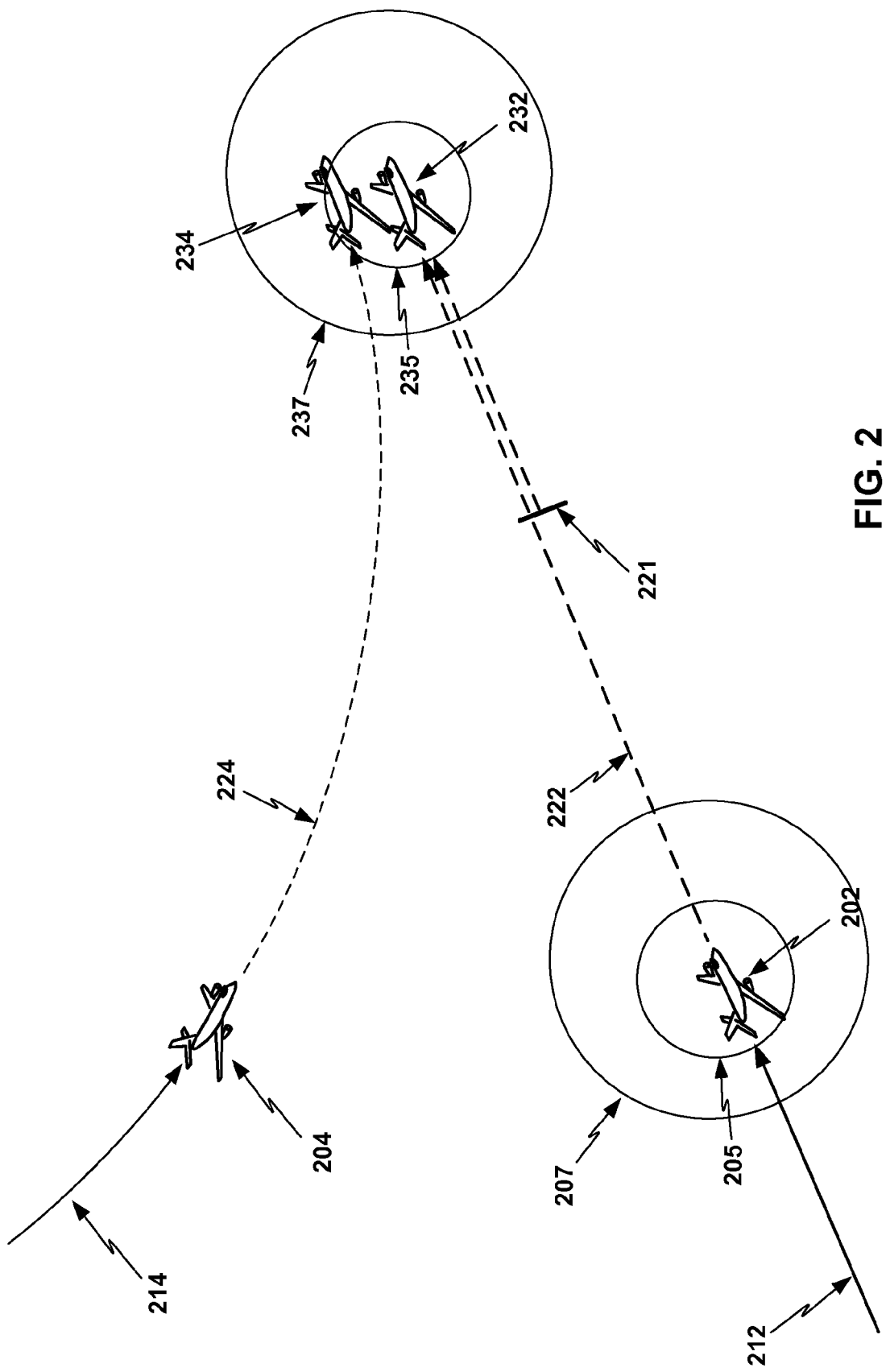
FIG. 2 shows a conceptual diagram of two aircraft, an own aircraft and a target aircraft, in flight toward each other and potentially on course for a protected airspace violation, where the own aircraft is equipped with a speed-based threshold unit in an example implementation of this disclosure.

FIG. 2 shows a conceptual diagram of two aircraft, an own aircraft 202 and a target aircraft (or intruder aircraft) 204, in flight toward each other and potentially on course for a protected airspace violation, where own aircraft 202 is equipped with a speed-based threshold unit 134 in an example implementation of this disclosure. Own aircraft 202 shown in FIG. 2 may be an example of own aircraft 100 shown in FIG. 1. FIG. 2 shows an illustrative example of a flight context in which own aircraft 100 with TCAS computer 102 of FIG. 1 is represented in FIG. 2 as own aircraft 202, and in which TCAS computer 102 installed onboard own aircraft 202 may predict trajectories of own aircraft 202 and target aircraft 204 and generate a protected airspace violation alert based on speed-based sensitivity thresholds.

TCAS computer 102 as shown in FIG. 1 may be installed onboard own aircraft 202, and may receive information on the recent and current trajectory of own aircraft 202 from other systems aboard own aircraft 202. TCAS computer 102 on own aircraft 202 may also receive information about target aircraft 204, such as ADS-B reports or other cooperative surveillance information from target aircraft 204 containing information on the recent and current trajectory of target aircraft 204. TCAS computer 102 on own aircraft 202 may thus determine that own aircraft 202 is on a straight recent trajectory 212, and that target aircraft 204 is on a recent trajectory 214 turning with a constant turn rate, as shown in FIG. 2. TCAS computer 102 on own aircraft 202 may also extrapolate from the information it has to determine a predicted trajectory 222 of own aircraft 202 at a speed, heading, and altitude continuous with its recent trajectory 212, and to determine a predicted trajectory 224 of target aircraft 204 at a speed, heading, constant turn angle, and altitude continuous with its recent trajectory 214 (a "trajectory" may be considered to include speed, heading, altitude, and any turn angle). In other examples, TCAS computer 102 may incorporate other information into its predicted trajectories for own aircraft 202 and target aircraft 204, such as acceleration or deceleration, or a climb or descent in altitude.

FIG. 2 also shows collision airspace zone (CAZ) 205 and protected airspace zone (PAZ) 207 around own aircraft 202. TSAA system 106 on TCAS computer 102 may determine CAZ 205 and PAZ 207 within certain distances around own aircraft 202, and determine if or when any other object, potentially including target aircraft 204, is predicted to intersect CAZ 205 or PAZ 207 of own aircraft 202. TCAS computer 102 may define CAZ 205 with an x-y range around own aircraft 202 at a greater range in the direction of motion in some examples, and a constant z height above and below own aircraft 202. The dimensions of the CAZ may be correlated with the size and/or speed of own aircraft 202 in some examples. TCAS computer 102 may define PAZ 211 to depend on factors of prediction uncertainty, with an x-y radius around own aircraft 202 and a z height above and below own aircraft 202 that may be greater than the corresponding dimensions for CAZ 205 in various examples.

TCAS computer 102 on own aircraft 202 may determine based on predicted trajectories 222 and 224 that these predicted trajectories 222 and 224 will bring ownship 202 and target aircraft 204 into proximate future positions 232 and 234, such that target aircraft 204 is predicted to violate the airspace (at least PAZ 207 if not also subsequently CAZ 205) of own aircraft 202, in a predicted interval of time of, e.g., in 35 seconds of the present (e.g., in 35 seconds of the most recent prediction determination by TCAS computer 102 at the update rate of, e.g., one hertz). This interval of time before a predicted violation of the airspace (PAZ or CAZ) of own aircraft 202 by target aircraft 204 may be referred to as a predicted airspace violation interval.

TCAS computer 102 on own aircraft 202 may then compare the predicted airspace violation interval with speed-based airspace violation alert threshold times in speed-based threshold unit 134 of TSAA system 106 of TCAS computer 102. Speed-based threshold unit 134 provides alert threshold times based on the speed of own aircraft 202 to ensure that an airspace violation alert is issued in a timely manner to allow a pilot sufficient time to react, while also ensuring that alerts are not issued prematurely such that the alerts would likely be false alarms and a nuisance (since either or both aircraft might deviate from the predicted trajectories in the meantime), and encourage pilots to treat the alerts with complacency. In these regards, speed-based threshold unit 134 may be contrasted with an altitude-based threshold unit in which a TCAS computer provides alert threshold times based on the altitude of the own aircraft.

For example, if own aircraft 202 is flying at high speed, e.g., over 400 knots, speed-based threshold unit 134 of TCAS computer 102 may set a sensitivity level to 7 out of 7, and accordingly set an airspace violation alert threshold time at a maximum time interval of 35 seconds before predicted impact. However, if own aircraft 202 is flying at 400 knots and also flying at low altitude, e.g., just over 1,000 feet, a traditional TCAS computer with altitude-based airspace violation alert sensitivity levels would typically set the sensitivity level to 3 out of 7, and accordingly set an airspace violation alert threshold time at a time interval of only 15 seconds before predicted impact, when own aircraft 202 is at position 221 along its predicted trajectory 222. An alert only 15 seconds before predicted impact at over 400 knots instead of the much slower speeds typically required of commercial or general aviation aircraft at 1,000 feet altitude may not give the pilot sufficient time to adjust speed and heading to avoid an airspace violation. Thus, the alerts provided by speed-based threshold unit 134 of TCAS computer 102 as in FIG. 1 may be highly advantageous for pilots operating aircraft at high speeds particularly at low altitudes.

An example set of sensitivity levels and airspace violation alert threshold times for which speed-based threshold unit 134 of TCAS computer 102 may be configured are provided as follows in Table 1.

TABLE 1

| Speed of own aircraft (knots) | 100-150 | 150-200 | 200-300 | 300-400 | >400 |
|---|---|---|---|---|---|
| Sensitivity level | 3 | 4 | 5 | 6 | 7 |
| RA alert threshold time (tau) (s) | 15 | 20 | 25 | 30 | 35 |

The values given in Table 1 are merely one example, and any of a variety of other speed ranges, sensitivity levels, and alert threshold times may be applied by speed-based threshold unit 134 of TCAS computer 102 in other examples. Speed and alert threshold time are given in knots and seconds, respectively, while sensitivity level (SL) is given in an arbitrary integer measure analogous to familiar usage in TCAS technology, where sensitivity level of 1 is reserved for when the pilot selects a TCAS standby mode (normally only when the own aircraft is on the ground), and sensitivity level 2 is also reserved for a pilot selection of Traffic Advisories (TAs) only while Resolution Advisories (RAs) are inhibited. The column of a speed-based threshold table applied to the slowest speed range (e.g., 100-150 knots in Table 1) may overlap with the lowest stall speed of the aircraft such that it effectively covers the lowest airborne speed of which the aircraft is capable.

RA alert threshold time refers to time before predicted closest approach when TCAS computer 102 issues a Resolution Advisory (RA) alert, as a particular example. TCAS computer 102 may also issue a Traffic Advisory (TA) at an earlier time than the RA alert at each sensitivity level. RA alert threshold time is also indicated parenthetically in Table 1 as "tau" as it may be equivalent with time tau as commonly understood in TCAS technology, defined as range between aircraft divided by closure rate between aircraft, where range is equivalent to radius or separation distance between the two aircraft, and closure rate is the negative of the range rate, or rate of change between the two aircraft. Speed as shown in Table 1 and applied by speed-based threshold unit 134 of TCAS computer 102 may refer to air speed or ground speed in different examples. Speed-based threshold unit 134 may apply these values of alert threshold time as a function of speed as part of specialized algorithms or collections of specialized algorithms or resources implemented as part of conflict detector unit 132, as further described below with reference to FIG. 3. By generating a collision avoidance alert such as an RA at an alert time before closest approach determined based on the speed of the aircraft, a TCAS computer with speed-based alert thresholds of this disclosure may enable the pilot sufficient time to adjust speed or heading or otherwise take action, at any speed and regardless of altitude.

Thus, speed-based threshold unit 134 of TCAS computer 102 may be configured to select a sensitivity level based on the speed of the own aircraft. Conflict detector unit 132 and output node 141 may be configured to generate alert outputs based on the selected sensitivity level. In particular, conflict detector unit 132 and output node 141 may be configured to generate alert outputs in response to determining that a violation of protected airspace is predicted and that a predicted time to closest approach between the own aircraft and the target aircraft is less than an alert threshold time based on the selected sensitivity level.

FIG. 3 depicts an example functional block diagram of an example TSAA system 106 as part of TCAS computer 102 and implemented on own aircraft 100 or 202 as described above, with additional detail for illustrative examples in which conflict detector unit 132 of TSAA system 106 includes speed-based threshold unit 134, as in FIG. 1. Conflict detector unit 132 includes speed-based threshold unit 134 as part of a conflict search engine 140, in this example. Conflict detector unit 132 also includes a trajectory propagation unit 133, a threat data store 136, and a conflict verification unit 144, as shown in FIG. 3. Conflict detector unit 132 is configured to receive aircraft states 122 of both own aircraft 202 and target aircraft 204 as inputs, determine whether there are any predictions of protected airspace violations (e.g., of a predicted trajectory of target aircraft 204 intersecting a PAZ or a CAZ of own aircraft 202 at a predicted position of own aircraft 202), and generate alert outputs 142 based on those determinations, as described above with reference to FIGS. 1 and 2.

Trajectory propagation unit 133 of TSAA system 106 of this disclosure may implement methods, algorithms, or techniques to predict aircraft trajectories of both own aircraft 202 and one or more target aircraft, such as target aircraft 204, based on any of a wide variety of information sources. These information sources may include speed, heading, and altitude indications of both own aircraft 202 and target aircraft 204, respectively from various aircraft systems of own aircraft 202 and from surveillance information on target aircraft 204 including ADS-B messages from target aircraft 204.

Trajectory propagation unit 133 may receive the aircraft state input 122, store and access respective information for each of one or more proximate target aircraft as potential threats in threat data store 136, and repeatedly compare predicted target aircraft trajectories with predicted own aircraft trajectories. As shown in FIG. 3, trajectory propagation unit 133 may receive as an input a selected look-ahead time 131, or the forward time interval to extend the applicable aircraft trajectory predictions (e.g., between around 20 seconds and around 60 seconds in some examples). As shown in FIG. 3, trajectory propagation unit 133 may also apply trajectory discretization, e.g., decomposing trajectories of aircraft into discrete states of position, heading, and altitude of the respective aircraft at discrete times along the aircraft trajectories, to facilitate calculations to determine predicted future trajectories. Trajectory propagation unit 133 may use these features and information to determine or predict one or more future trajectories for each applicable aircraft, including own aircraft 202 and one or more target aircraft such as target aircraft 204, and potentially including a large number of proximate target aircraft.

As shown in FIG. 3, trajectory propagation unit 133 may output its results to conflict search engine 140. Conflict search engine 140 may compare the predicted trajectories for own aircraft 202 and the one or more target aircraft to determine whether any of the one or more target aircraft at any given time in any of their predicted trajectories would intercept the protected airspace of own aircraft 202 at the same given time in its predicted trajectory. In some examples, conflict search engine 140 may determine and apply the Collision Airspace Zone (CAZ) and Protected Airspace Zone (PAZ) around own aircraft 202 as described above, including sizing the CAZ and PAZ as discussed above. Conflict search engine 140 may also determine and apply a CAZ and/or a PAZ around a target aircraft, in some examples. Conflict search engine 140 may also apply double trigger techniques, e.g., two consecutive predicted violations of CAZ or PAZ, to reduce nuisance alerts from a lone erroneous predicted violation, unless the predicted violation is below a double trigger threshold requiring an immediate alert, in implementing its determination of a predicted airspace violation. Conflict search engine 140 may generate outputs indicating predicted airspace violations and information relevant to those predicted airspace violations to conflict verification unit 144.

Conflict search engine 140 includes speed-based threshold unit 134 which includes speed-based threshold table 138, in the example of FIG. 3. Speed-based threshold unit 134 may compare the speed (e.g., air speed or ground speed) of own aircraft 202 with the information in speed-based threshold table 138, such as given in Table 1 above, to determine an alert threshold time based on the speed. Conflict search engine 140 may determine whether the predicted trajectories of own aircraft 202 and target aircraft 204 intersect at a future time, and may compare a currently determined time to closest approach, tau, between own aircraft 202 and target aircraft 204 to the alert threshold time outputted by speed-based threshold unit 134. If the determined time to closest approach, tau, is greater than the alert threshold time, conflict search engine 140 may refrain from communicating an output on to conflict verification unit 144, and continue performing new conflict searches and new comparisons with tau based on further incoming information from trajectory propagation unit 133. If conflict search engine 140 determines that the time to closest approach, tau, is less than the alert threshold time, then conflict search engine 140 may issue an alert output to conflict verification unit 144 for verification before being issued by conflict detector unit 132.

Conflict verification unit 144 may run tests or checks to verify or assure the accuracy of the predicted airspace violations determined by conflict search engine 140. For example, conflict verification unit 144 may perform a tau check and a closure check, to verify or confirm the tau and the closure rate, in accordance with TSAA algorithms (tau being, e.g., range over closure rate as described above, which may be equivalent to time to predicted closest approach of target aircraft and own aircraft 202). In some examples, conflict verification unit 144 may either override a potential protected airspace violation alert that it finds inconsistent or that fails to pass the conflict verification checks, or conflict verification unit 144 may confirm the potential alert and enable conflict detector unit 132 to generate an alert output 142 via output node 141.

In some examples, speed-based threshold unit 134 may not necessarily be part of conflict search engine 140, but may be a separate part of conflict detector unit 132. For example, speed-based threshold unit 134 may provide the selected look-ahead time 131 based on speed-based threshold table 138, as an input to trajectory propagation unit 133, instead of or in addition to providing speed-based threshold times to conflict search engine 140 to compare to the time tau of closest approach. In these examples, trajectory propagation unit 133 may perform propagations of recent and current trajectories and make determinations of predicted trajectories of own aircraft 202 and target aircraft 204 into a future interval of time, a look-ahead time 131, selected by reference to the speed-based threshold time determined by speed-based threshold unit 134. Thus, in these examples, the higher the speed of own aircraft 202, the greater the look-ahead time 131 by which trajectory propagation unit 133 propagates aircraft trajectories and determines predicted aircraft trajectories.

In any of the above examples, speed-based threshold table 138 may be encoded or stored as an ordered set of data such as a vector, a hash-map, or an array, for example, and speed-based threshold unit 134 may be implemented using executable software instructions that refer to the data of speed-based threshold table 138. In some examples, speed-based threshold unit 134 may be a portion of a larger set of executable software instructions with which conflict detector unit 132 is implemented, and which may be executed by processing hardware of TCAS computer 102. Trajectory propagation unit 133, conflict search engine 140, and conflict verification unit 144 may similarly be implemented as portions of executable software instructions, and/or with embedded firmware and/or specialized hardware elements. In some examples, speed-based threshold unit 134 and/or other portions of conflict detector unit 132 or of TCAS computer 102 may be implemented with at least some functions implemented in embedded firmware, one or more graphical processing units (GPUs), one or more field programmable gate array (FPGAs), one or more application-specific integrated circuits (ASICs), or other specialized hardware.

FIG. 4 shows a flowchart for a method 400 that a TCAS computer 102 with speed-based alert thresholds, as shown in FIGS. 1 and 3 and described above with reference thereto, may perform in some examples. TCAS computer 102 may determine (e.g., by a trajectory propagation unit 133) predicted trajectories for an own aircraft and a target aircraft (e.g., own aircraft 100, 202 and target aircraft 204) (402). TCAS computer 102 may further determine (e.g., by conflict search engine 140) whether a violation of protected airspace is predicted between the own aircraft and the target aircraft (404). TCAS computer 102 may further determine (e.g., by conflict search engine 140 and/or speed-based threshold unit 134) whether a predicted time to closest approach between the own aircraft and the target aircraft is less than an alert threshold time based on a speed of the own aircraft (406). TCAS computer 102 may further generate (e.g., by conflict search engine 140 and/or one or more other units of TSAA system 106 and/or ASSAP tracker 104) an alert output, in response to determining that a violation of protected airspace is predicted and that the predicted time to closest approach between the own aircraft and the target aircraft is less than the alert threshold time based on the speed of the own aircraft (408).

Generating the alert output may include generating an alert itself, or generating a signal output to a physical alert system such as an audio speaker and/or a visual display to generate the alert itself. In some examples, a computer program product may include a software upgrade or software modification, or a complete set of software, configured for loading or storing executable software instructions onto TCAS computer 102 or other collision avoidance computer to implement method 400 as shown in FIG. 4 or otherwise implement speed-based alerting thresholds as described above.

In some examples, TCAS computer 102 including ASSAP tracker 104 using TSAA system 106 of FIG. 1 may fulfill the sensitivity thresholds functionality specifications of the DO-185 standard when the aircraft is complying with standard speeds per altitude for commercial aviation or general aviation, and may also provide speed-based thresholds when the aircraft is flying at higher speeds for a given altitude than is standard for commercial or general aviation. That is, in some examples of this disclosure, TCAS computer 102 may incorporate speed-based threshold unit 134 as well as an altitude-based alerting threshold unit, and may be capable of selectively operating in either speed-based or altitude-based alert threshold modes. In these examples, TCAS computer 102 may enable a pilot to select either speed-based or altitude-based alert threshold modes when operating in non-standard or standard commercial aviation contexts, respectively. This may be useful in some contexts in which an aircraft is required to employ the altitude-based alert threshold mode in certain airspaces or certain operating conditions, but may also usefully employ the speed-based alert threshold mode in other airspaces or operating conditions. In other examples, ASSAP tracker 104 may fulfill other functionality specifications of other standards such as for other regions.

A speed-based threshold unit 134 as disclosed above may be implemented in any of a variety of additional types of circuit elements in addition to those described above, such as a magnetic nonvolatile random-access memory (RAM) or other types of memory, a mixed-signal integrated circuit, a central processing unit (CPU), a microcontroller, a programmable logic controller (PLC), a system on a chip (SoC), a subsection of any of the above, an interconnected or distributed combination of any of the above, or any other type of component or one or more components capable of being configured in accordance with any of the examples disclosed herein.

Various aspects of the disclosure have been described. These and other aspects are within the scope of the following claims.

What is claimed is:

1. A system comprising one or more processors that implement:
   a trajectory propagation unit configured to determine predicted trajectories for an own aircraft and a target aircraft;
   a conflict search engine configured to determine whether a violation of protected airspace is predicted between the own aircraft and the target aircraft;
   a speed-based threshold unit configured to determine whether a predicted time to closest approach between the own aircraft and the target aircraft is less than an alert threshold time based on a speed of the own aircraft; and
   wherein the one or more processors are configured to generate an alert output, in response to determining that a violation of protected airspace is predicted and that the predicted time to closest approach between the own aircraft and the target aircraft is less than the alert threshold time based on the speed of the own aircraft.

2. The system of claim 1, wherein the speed-based threshold unit comprises a speed-based threshold table that designates a set of alert times and corresponding speed ranges to which the alert times are applicable.

3. The system of claim 2, wherein the alert time is 15 seconds for a lowest speed range designated in the speed-based threshold table.

4. The system of claim 2, wherein the alert time is 35 seconds for a highest speed range designated in the speed-based threshold table.

5. The system of claim 2, wherein the speed-based threshold table includes five speed ranges, and alert times of 15, 20, 25, 30, and 35 seconds respectively corresponding to each of the five speed ranges.

6. The system of claim 1, wherein the speed-based threshold unit applies a ground speed of the own aircraft as the speed of the own aircraft.

7. The system of claim 1, wherein the speed-based threshold unit applies an air speed of the own aircraft as the speed of the own aircraft.

8. The system of claim 1, further comprising an altitude-based threshold unit configured to determine whether a predicted time to closest approach between the own aircraft and the target aircraft is less than an alert threshold time based on an altitude of the own aircraft, wherein the system enables the alert threshold time to be selectably based on either the speed or the altitude of the own aircraft.

9. The system of claim 1, wherein the speed-based threshold unit is configured to select a sensitivity level based on the speed of the own aircraft, and
   wherein the system is configured to generate the alert output based on the selected sensitivity level.

10. The system of claim 9, further configured to generate the alert output via an alert output node in response to determining that the violation of protected airspace is predicted and that the predicted time to closest approach between the own aircraft and the target aircraft is less than the alert threshold time based on the selected sensitivity level.

11. A method comprising:
    determining, by one or more processors, predicted trajectories for an own aircraft and a target aircraft;
    determining, by the one or more processors, whether a violation of protected airspace is predicted between the own aircraft and the target aircraft;
    determining, by the one or more processors, whether a predicted time to closest approach between the own aircraft and the target aircraft is less than an alert threshold time based on a speed of the own aircraft; and
    generating, by the one or more processors, an alert output, in response to determining that a violation of protected airspace is predicted and that the predicted time to closest approach between the own aircraft and the target aircraft is less than the alert threshold time based on the speed of the own aircraft.

12. The method of claim 11, wherein determining whether the predicted time to closest approach between the own aircraft and the target aircraft is less than the alert threshold time based on the speed of the own aircraft comprises referring to a speed-based threshold table that designates a set of alert times and corresponding speed ranges to which the alert times are applicable.

13. The method of claim 12, wherein the alert time is 15 seconds for a lowest speed range designated in the speed-based threshold table.

14. The method of claim 12, wherein the alert time is 35 seconds for a highest speed range designated in the speed-based threshold table.

15. The method of claim 12, wherein the speed-based threshold table includes five speed ranges, and alert times of 15, 20, 25, 30, and 35 seconds respectively corresponding to each of the five speed ranges.

16. The method of claim 11, wherein determining whether the predicted time to closest approach between the own aircraft and the target aircraft is less than the alert threshold time based on the speed of the own aircraft comprises applying a ground speed of the own aircraft as the speed of the own aircraft.

17. The method of claim 11, wherein determining whether the predicted time to closest approach between the own aircraft and the target aircraft is less than the alert threshold time based on the speed of the own aircraft comprises applying an air speed of the own aircraft as the speed of the own aircraft.

18. The method of claim 11, wherein determining whether the predicted time to closest approach between the own aircraft and the target aircraft is less than the alert threshold time based on the speed of the own aircraft comprises selecting a sensitivity level based on the speed of the own aircraft, and wherein generating the alert output comprises generating the alert output based on the selected sensitivity level.

19. A non-transitory computer program product configured for loading or storing executable instructions on a collision avoidance computer, the computer program product comprising:

a portion of executable instructions configured to determine predicted trajectories for an own aircraft and a target aircraft;

a portion of executable instructions configured to determine whether a violation of protected airspace is predicted between the own aircraft and the target aircraft;

a portion of executable instructions configured to determine whether a predicted time to closest approach between the own aircraft and the target aircraft is less than an alert threshold time based on a speed of the own aircraft; and a portion of executable instructions configured to generate an alert output, in response to determining that a violation of protected airspace is predicted and that the predicted time to closest approach between the own aircraft and the target aircraft is less than the alert threshold time based on the speed of the own aircraft.

20. The computer program product of claim 19, wherein the portion of executable instructions configured to determine whether the predicted time to closest approach between the own aircraft and the target aircraft is less than the alert threshold time based on the speed of the own aircraft includes a speed-based threshold table that designates a set of alert times and corresponding speed ranges to which the alert times are applicable.

\* \* \* \* \*